Jan. 4, 1966

G. H. GASS ETAL 3,227,139

ANIMAL METABOLISM CAGE

Filed July 8, 1964

George H. Gass,
Charles A. Bunten,
Inventors.
Koenig, Pope, Senniger and Powers,
Attorneys.

Jan. 4, 1966  G. H. GASS ETAL  3,227,139
ANIMAL METABOLISM CAGE
Filed July 8, 1964  2 Sheets-Sheet 2

United States Patent Office 3,227,139
Patented Jan. 4, 1966

3,227,139
ANIMAL METABOLISM CAGE
George H. Gass and Charles A. Bunten, Carbondale, Ill., assignors to Southern Illinois University Foundation, Carbondale, Ill., a corporation of Illinois
Filed July 8, 1964, Ser. No. 381,618
28 Claims. (Cl. 119—17)

This application is a continuation-in-part of our copending coassigned but now abandoned application Serial No. 284,076, filed May 29, 1963, for animal metabolism cage.

This invention relates to animal cages, and more particularly to an animal metabolism cage utilized for collecting and separating excreted matter from test animals, such as mice, rats, hamsters, guinea pigs and rabbits.

Animal metabolism cages are widely used today in research and the like where it is important to collect, weigh, and/or analyze the excreted matter, i.e., feces and urine, of test animals. Such cages are used with small rodents such as mice, rats, hamsters and other animals which excrete a solid, relatively dry fecal product. In order to obtain accurate results, it is important to have a complete separation of the feces and urine without any contamination of the urine by feces or contamination of the feces by the urine. Also, it is essential that the total volume or weight of the excreted matter be recovered as any loss in volume or weight of the excreted matter, such as would occur by evaporation of urine, causes inaccurate test results. Animal metabolism cages employed heretofore are of such design that complete separation of the solid and liquid excreted matter could not reliably be effected.

Further, there is an unfulfilled need for an inexpensive metabolism cage which can be employed with radioactive labeled substances and then disposed of with no danger to laboratory personnel. Studies employing radioactive materials are frequently carried out, and it is important to provide for the removal of solid and liquid excreted matter from the cage without personal contact with any contaminated components.

Among the several objects of the invention may be noted the provision of an animal metabolism cage in which the liquid and solid excreted matter is separated and collected in separate containers or compartments so that the separated matter may be removed or recovered without personal contact with any contaminated components; the provision of such a cage in which liquid excreted matter is collected entirely within a container without loss of the liquid by splashing or falling outside the liquid collecting container thereby to effect a complete separation between solid excreted matter and liquid excreted matter; the provision of such a cage in which the test animal is confined in one compartment and the excreted matter is collected in another compartment, the compartment for the test animal being removable from the other compartment so that excreted matter in the other compartment may be easily recovered; the provision of such a cage which is of inexpensive construction and may be disposed of after a single use in test work employing radioactive substances; the provision of an animal metabolism cage such as described having feeding and watering means for the encaged animal; and the provision of an animal metabolism cage which is reliable in use and economical in cost. Other objects and features will be in part apparent and in part pointed out hereinafter.

Briefly, this invention comprises an animal metabolism cage for collecting and separating matter excreted by test animals housed in the cage, the cage having an upper compartment in which an animal to be tested is confined and a generally funnel-shaped member below the compartment discharge opening at its lower end. A deflector is positioned within the funnel-shaped member over the discharge opening and is spaced from the opening to provide a clearance so that excreted matter may pass between the deflector and the funnel-shaped member through the discharge opening, and means are positioned below the discharge opening to separate liquid and solid excreted matter passing through the discharge opening. The deflector is formed to shield said discharge opening from direct fall of excreted matter therethrough and to deflect excreted matter falling thereon over to the wall of the funnel-shaped member. Thus, liquid excreted matter falling downwardly onto the deflector runs down the top of the deflector (which is outwardly flared) and runs off onto the inner surface of the funnel-shaped member, from whence it runs out through the discharge opening. Some liquid matter running down the deflector may cling to it and run off the lower end of the deflector. Solid excreted matter falling down onto the deflector is deflected against the inner surface of the funnel-shaped member from whence it rolls down through the discharge opening. The liquid and solid excreted matter passed through the discharge opening are then separated by a separator member positioned below the discharge opening.

The invention accordingly comprises the constructions hereinafter described, the scope of the invention being indicated in the following claims.

In the accompanying drawings in which several of various possible embodiments of the invention are illustrated, FIG. 1 is an elevation of an animal metabolism cage constructed in accordance with this invention;

Corresponding reference characters indicate corresponding parts throughout the several views of the drawings.

Figure 1:
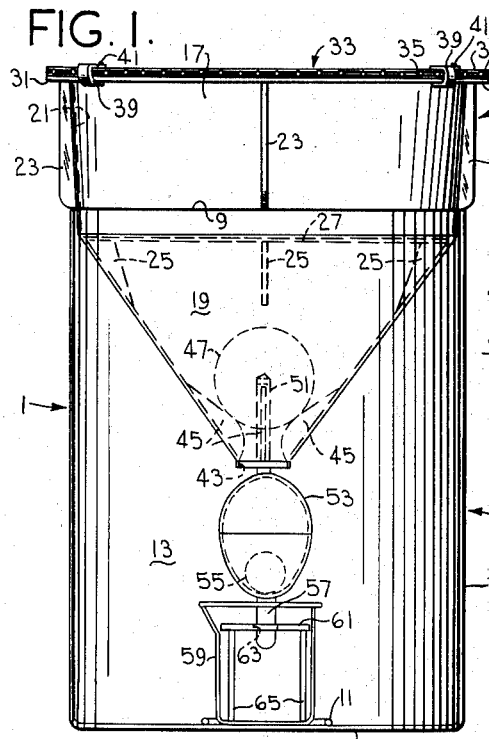
Figure 2:
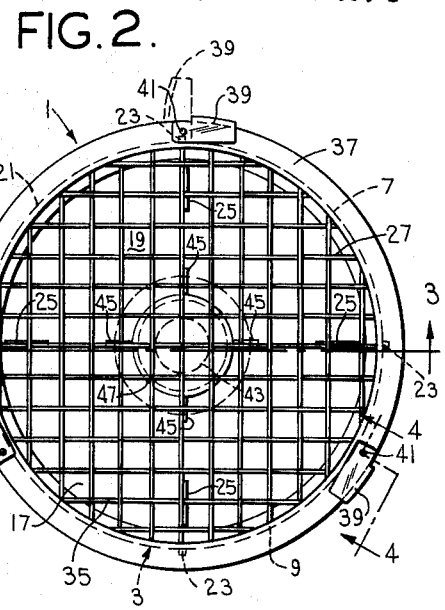
FIG. 2 is a plan of the cage shown in FIG. 1.

Referring to FIGS. 1 and 2 of the drawings, a first version of an animal metabolism cage embodying the present invention is generally designated 1. Cage 1 comprises a cylindrical container or housing generally designated 3 preferably formed of a plastic material which is adapted to withstand a reasonable temperature such as, for example, acrylic plastic. Container 3 has a bottom 5, a circular wall 7, and an open upper end defining an upper circular edge 9. Extending above the inside surface of bottom 5 is an annular rib 11 integral with bottom 5. The space or area within the lower portion of container 3 forms a lower compartment 13 in which excreted matter from test animals is collected, as will be described hereinafter.

Supported on upper circular edge 9 of container 3 is a removable cage unit generally designated 15 which may be readily lifted or removed from edge 9 to gain access to lower compartment 13. Cage unit 15 is formed of a nonabsorbent material such as, for example, clear polystyrene or other suitable plastic material, and has an upper compartment 17 and a lower funnel-shaped compartment 19. Extending from the outer surface of wall section 21 of upper compartment 17 are fins or flanges 23 spaced 90° from each other along the periphery of wall 21. The bottom edges of flanges 23 contact upper edge 9 and support cage unit 15 within container 3. Projecting inwardly from the upper end of funnel-shaped compartment 19 are flanges 25 spaced 90° from each other about the inner surface of funnel-shaped section 19. Supported on the upper edges of flanges 25 is a removable wire-mesh screen 27 forming a perforated or foraminous floor for upper compartment 17. The space or area defined by wall section 21 defines compartment 17 which forms an enclosure for a test animal designated A and shown in FIG. 3 as supported on wire screen or floor 27. Test animals will normally be of the rodent class having a relatively dry feces or fecal matter, such as rats, mice, hamsters, and guinea pigs. It is to be understood that floor or bottom 27 may be other than a wire screen, but must be perforated or foraminous to allow matter excreted by animals at any location within compartment 17 to fall downwardly by gravity into funnel-shaped compartment 19.

Figure 4:
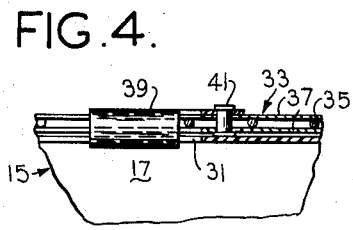
FIG. 4 is an enlarged fragment, partly in section, taken on line 4—4 of FIG. 2.

Projecting outwardly from the upper end of wall 21 of upper compartment 17 is a rim or flange 31. A removable cover or lid generally designated 33 is secured to rim 31 to form a top for compartment 17. Cover 33 is formed of wire-mesh screen 35 to provide ventilation for upper compartment 17, and is provided with a rim 37 at its outer circumference. Catches or latches 39 are pivotally mounted at 41 on rim 37 for swinging movement toward and away from locking engagement with rim 31. As shown in FIG. 4, catches 39 are generally U-shaped and may be swung inwardly to engage rim 31 with the rim received in latches 39 thereby to secure cover 33, and then swung outwardly away from rim 31 thereby to allow cover 33 to be removed for access to compartment 17 as indicated by broken lines in FIG. 2. It is to be understood that cover 33 could be of various forms and could be provided with a feeding unit and/or a watering unit for test animals within upper compartment 17, if desired.

At the lower end of funnel-shaped compartment 19 is a discharge opening 43. Ribs 45 extend inwardly from the inner surface of compartment 19 adjacent opening 43 and are spaced 90° from each other around the periphery of compartment 19. Supported on the inner surfaces of ribs 45 is a deflector 47 preferably formed of plastic or glass or other material to which liquid excreted matter will cling. As shown, deflector 47 is constituted by a glass ball. It will be understood, however, that deflector 47 may assume other forms (e.g., generally spheroidal) in which the contour of the upper portion thereof is outwardly flared and the contour of the lower portion thereof is inwardly flared so that liquid excreted matter contacting the deflector will run down the deflector until the lowermost portion of the inwardly flared portion is reached. Also, as shown, the annular connection between the upper and lower portions of the deflector is smoothly rounded so that liquid excreted matter will not drip off the deflector as it flows from the upper to the lower portion thereof. Threaded within deflector 47 is a rod or rodlike member 51 extending down from the lower end of deflector 47 through discharge opening 43. It is to be noted that ribs 45 space deflector 47 from the inner surface of funnel-shaped compartment 19 and provide a clearance between the inner surface of funnel-shaped compartment 19 and deflector 47.

A separator member or second deflector 53 is secured to the lower end of rod 51 below discharge opening 47. As shown, separator member 53 is generally egg-shaped, but as in the case of deflector 47, it may assume other forms in which the contour of the upper portion thereof is outwardly flared and the contour of the lower portion thereof is inwardly flared so that liquid excreted matter contacting separator member 53 will run down the outer surface thereof until the lowermost portion of the inwardly flared portion is reached. A weight 55 within separator member 53 aids in maintaining member 53 in position. Secured to the lower end of separator member 53 is an extension 57 constituted by a glass rod. A receptacle 59 is positioned beneath extension 57 within the area defined by rib 11 and receives liquid excreted matter, such as urine, which drips from extension 57, as will be described hereinafter. Receptacle 59 has an open generally circular upper end and is of a width or diameter at least not substantially greater than the width or widest transverse measurement of separator member 53. Receptacle 59 may be, for example, a glass beaker of the conventional type widely employed in laboratories. Fitting within receptacle 59 is a table 61 having a central opening 63 receiving the lower end of extension 57. Legs 65 extend down from the bottom of table 61 to the bottom of receptacle 59 and support table 61 in the desired position.

In practice, a test animal A will be confined in upper compartment 17 for a predetermined period of time. During this period, urine excreted by the animal at any location within compartment 17 falls by gravity through foraminous floor 27 against the inner surface of funnel-shaped compartment 19 or against the upper portion of deflector 47. If the urine strikes the inner surface of funnel-shaped compartment 19, it flows down through discharge opening 43, and onto the upper portion of separator member 53 and thence down along the outer surface of separator member 53 until it reaches the lowermost portion of the inwardly flared lower portion of member 53. Urine clings to the relatively smooth surface of separator member 53 in flowing down to the lowermost portion thereof and then flows along extension 57 through opening 63 in table 61 and drips from the lower end of extension 57 into receptacle 59.

In the event the urine strikes the surface of deflector 47, it either adheres thereto or is deflected onto the inner surface of funnel-shaped member 19. If deflected against the funnel-shaped member, the urine follows the same path of travel described above. However, if the urine adheres to deflector 47, it flows down the outer surface of deflector 47 until it reaches the lowermost portion of the inwardly flared lower portion. It then runs down onto rod 51, thence along rod 51 to deflector 53 where it follows the same path of travel described above and drips into receptacle 59 for collection. The arrangement of deflector 47 over discharge opening 43 interrupts or breaks the fall of the urine over opening 43 and prevents urine from falling directly onto separator member 53 with resultant splashing of the urine outwardly of member 53 whereby such urine is not collected in receptacle 59. This arrangement thus insures that all urine excreted by the test animal in compartment 17 is collected in receptacle 59.

Upon excretion by the test animal of feces or fecal matter, which is normally in a solid dry condition, the feces drop through the openings in floor 27 onto the inner surface of funnel-shaped compartment 19 or the upper outwardly flared portion of deflector 47 from whence it is deflected against funnel-shaped member 19 since the dry excreted matter does not tend to adhere to the surface of deflector 47. After passing between the inner surface of funnel-shaped compartment 19 and deflector 47 through discharge opening 43 and onto separator member 53, the fecal matter strikes the upper outwardly flared portion of separator member 53 and is deflected outwardly of receptacle 59 onto the bottom 5 of container 3.

To recover the separated urine and feces, removable cage unit 15 with test animal A therein is lifted or removed from container 3 leaving the upper end of container 3 open. Receptacle 59 containing the urine collected may then be removed from container 3 and feces on the bottom 5 of container 3 may then be separately recovered.

Depending upon the materials from which the animal metabolism cage of the invention is constructed, the cage may be either disposed of after a single use or re-used many times after sterilization as by autoclaving. As previously mentioned, the cage may be inexpensively constructed of plastic materials such as polystyrene or acrylic plastic and in this form is particularly adapted for use in studies involving the employment of radio-active labeled substances. For this purpose, the cage would normally be disposed of after a single use. Even in this inexpensive form, the cage may, if desired, be sterilized a number of times before cracking or otherwise deteriorating. For more permanent use, the cage may be constructed of more expensive materials such as a rigid polyethylene plastic in which case the cage is adapted to withstand repeated sterilization at higher temperatures without appreciable deterioration.

Figure 3:
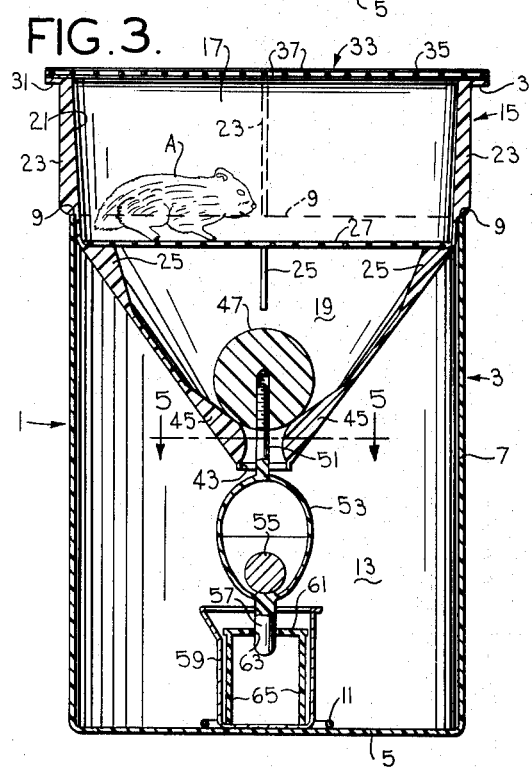
FIG. 3 is a vertical section taken on line 3—3 of FIG. 2.
Figure 5:
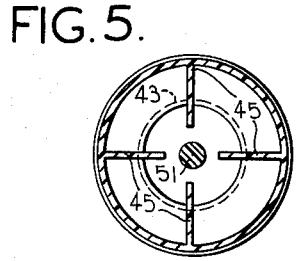
FIG. 5 is a horizontal section taken on line 5—5 of FIG. 3.
Figure 6:
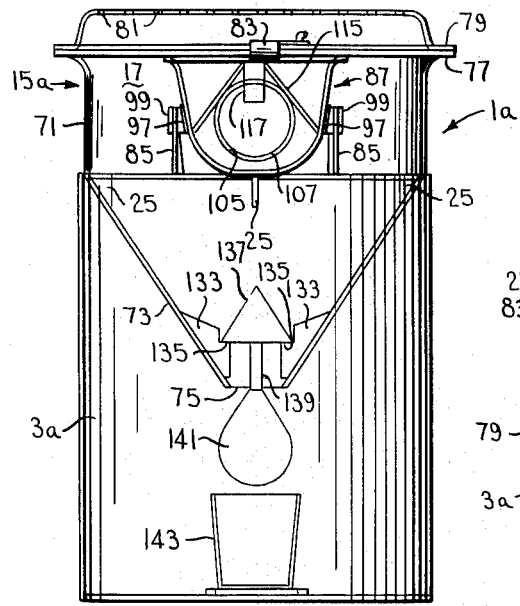
FIG. 6 is an elevation of a modification of the FIG. 1 cage.
Figure 7:
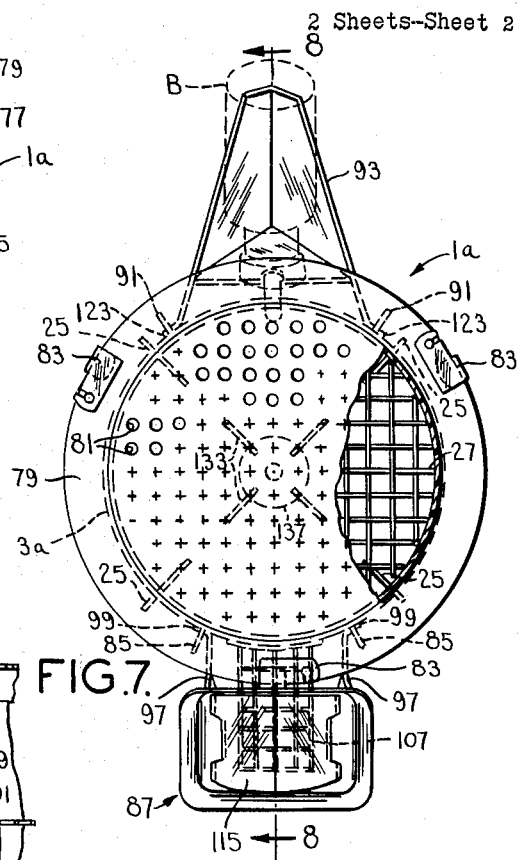
FIG. 7 is a plan of FIG. 6.
Figure 9:
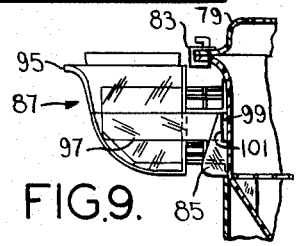
FIG. 9 is a fragmentary detail.
Figure 8:
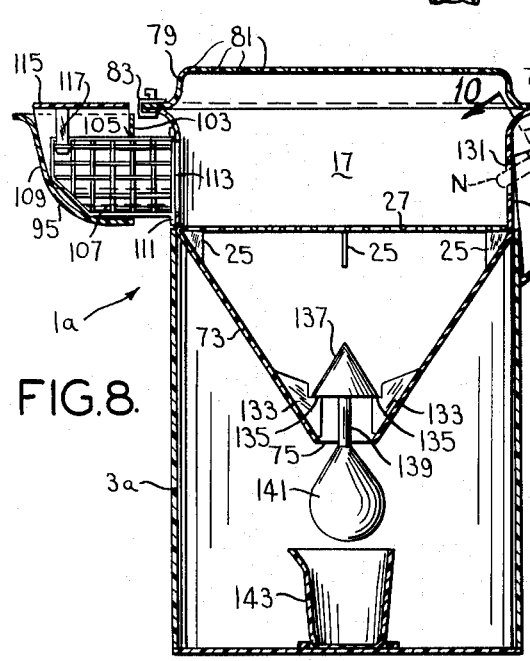
FIG. 8 is a vertical section taken on line 8—8 of FIG. 7.
Figure 10:
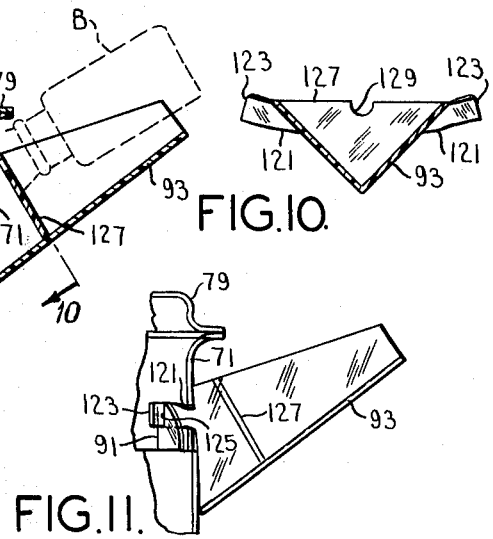
FIG. 10 is a section taken on line 10—10 of FIG. 8.
Figure 11:
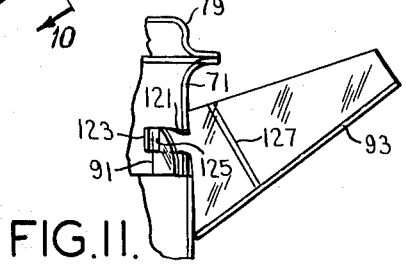
FIG. 11 is a fragmentary detail.

FIGS. 6 and 7 show a modified version of the animal metabolism cage, generally designated 1a, and comprising an open-top cylindrical plastic container 3a corresponding to that shown at 3 in FIGS. 1 and 3, and a modified cage unit 15a. The latter, which may be made of clear plastic, for example, comprises a thin-walled upper cylindric section 71 and an integral thin-walled lower funnel-shaped (conical) section 73 having a discharge opening 75 at its lower end. Section 71, which may be of slightly smaller diameter than container 3a, defines the animal compartment 17. Flanges or fins 25 spaced at 90° intervals around the top of funnel 73 support the wire-mesh screen floor 27 of compartment 17, as before. Section 71 has an outwardly projecting rim 77 at the top, and a thin plastic lid 79 having ventilating openings 81 is seated on this rim and held thereon by suitable latches such as the latches indicated at 83, similar to the latches 39.

Section 71 has a pair of lugs 85 extending outward therefrom at one side for removably supporting a feeding unit 87, and a pair of lugs 91 extending outward therefrom at the opposite side for removably supporting a cradle 93 for a standard watering bottle B. Lugs 85 and 91 bear on the rim of container 3a for supporting cage unit 15a.

The feeding unit 87 comprises an open-top plastic receptacle 95 having a pair of arms 97 projecting from opposite sides thereof, these arms having end portions 99 extending laterally outward from the arms at angles corresponding generally to the curvature of the cylindric outside surface of section 71. These arm end portions are received in notches 101 provided in lugs 85 extending down from the top of these lugs adjacent the cylindric outside surface of section 71 removably to support receptacle 95 on the outside of section 71. The wall 103 of receptacle 95 which faces section 71, and which is spaced outward therefrom, has a circular opening 105 receiving a cylindrical foraminous tunnel 107 made of wire-mesh screen. The latter extends into receptacle 95 to the outer wall 109 of receptacle 95, and extends out of receptacle 95 to the outside of section 71, having an outturned flange formation 111 at its end engaging section 71 around a hole 113 in the latter in communication with the tunnel. A shield 115 of inverted V-section is provided over the tunnel 107 in the receptacle, having a lug 117 which extends down into the tunnel through an enlarged opening of the screen (made by cutting out a piece of the wire of the screen).

The cradle 93 comprises a trough-like part of V-shape in cross section, of diminishing depth from one end constituting its inner end to its other and outer end. At its inner end, the cradle has a pair of integral arms 121 having twisted end portions 123 adapted to engage the cylindric outer surface of section 71 and to fit in notches 125 provided in lugs 91 extending down from the top of these lugs adjacent said surface removably to support the cradle. A partition 127 extends transversely of the cradle adjacent its inner end having a central notch 129 at the top for reception of the nipple N of the bottle B with the nipple accessible to the animal via a hole 131 in section 71.

Four ribs or fins 133 (similar to ribs 45) are provided on the inside of the funnel 73 at its lower end spaced at 90° intervals around the vertical central axis of the funnel. These fins are notches at their upper inner corners providing as indicated at 135 for supporting and centering a conical deflector 137, which may be formed of clear plastic. The diameter of the bottom of the conical deflector is greater than the diameter of discharge opening 75 but less than the diameter of the funnel at the level of the bottom of the conical deflector so that there are spaces between the periphery of the bottom of the conical deflector and the inside surface of the funnel (and between the fins 133) for exit of excreta. Threaded in the lower end of the conical deflector is a rod 139 (corresponding to rod 51) of smaller diameter than discharge opening 75, extending down through the latter and carrying a generally pear-shaped second deflector 141 on its lower end. Deflector 141 may be solid clear plastic, and overlies a breaker 143 (corresponding to beaker 59) standing on the bottom of container 3a at its center for deflecting fecal matter away from the beaker in the same manner as deflector 53 of FIGS. 1 and 3.

Usage and function of the modification shown in FIGS. 6–11 are generally the same as described above for the construction shown in FIGS. 1–5. A particularly important feature of the modification shown in FIGS. 6–11 is that the deflector-rod-deflector assembly 137, 139, 141 is self-centering, i.e., deflector 139 as seated on the steps 135 is inherently positioned with its axis vertical and substantially centered with respect to discharge opening 75, so that rod 139 is substantially centered in opening 75.

While the feeding unit 87 and bottle cradle 93 are shown as removable in FIGS. 6–11, it will be understood that they could be made integral with cage section 71. Generally, they are made removable in the case of disposable cages, so that they may be removed and reused, and are made integral in the case of cages of more or less permanent nature (i.e., cages made for repeated use and which can be autoclaved).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cage for collecting and separating matter excreted by test animals housed in the cage comprising an upper compartment in which a test animal is confined, a generally funnel-shaped member below said upper compartment having a discharge opening at its lower end, said upper compartment having a foraminous bottom communicating with said funnel-shaped member whereby matter excreted by an animal in any part of the upper compartment may pass through said bottom and be received in said funnel-shaped member, a deflector positioned within the funnel-shaped member over said discharge opening, the contour of the upper portion of said deflector being outwardly flared and the contour of the lower portion thereof being inwardly flared, said deflector being spaced from said discharge opening and the wall of said funnel-shaped member so that excreted matter received in said funnel-shaped member from the upper compartment may pass between the deflector and the wall of the funnel-shaped member through said discharge opening, and means below said discharge opening for separating liquid and solid excreted matter passing through said discharge opening.

2. A cage for collecting and separating matter excreted by test animals housed in the cage comprising an upper compartment in which a test animal is confined, a generally funnel-shaped member below said upper compartment having a discharge opening at its lower end, said upper compartment having a foraminous bottom communicating with said funnel-shaped member whereby matter excreted by an animal in any part of the upper compartment may pass through said bottom and be received in said funnel-shaped member, a deflector positioned within the funnel-shaped member over said discharge opening, the contour of the upper portion of said deflector being outwardly flared and the contour of the lower portion thereof being inwardly flared, said deflector being spaced from said discharge opening and the wall of said funnel-shaped member so that excreted matter received in said funnel-shaped member from the upper compartment may pass between the deflector and the wall of the funnel-shaped member through said discharge opening, and a separator member below said discharge opening for separating liquid and solid excreted matter passing through said discharge opening, the contour of the upper portion of said separator member being outwardly flared and the contour of the lower portion thereof being inwardly flared, the deflector and separator member being of such a nature that liquid excreted matter coming in contact therewith clings thereto until the lowermost portion of the respective inwardly flared portion of said deflector and separator member is reached.

3. A cage as set forth in claim 2 wherein the annular connection between the upper and lower portions of the deflector and separator member, respectively, is smoothly rounded.

4. A cage as set forth in claim 3 further comprising a receptacle beneath said separator member for collecting liquid excreted matter flowing therein from said separator member, said container having an open upper end of a width not substantially greater than the widest transverse measurement of the separator member whereby liquid excreted matter contacting the separator member clings to the surface thereof and flows into said receptacle and solid excreted matter falling onto said separator member is deflected outwardly of said receptacle.

5. A cage as set forth in claim 4 wherein said deflector and said separator member are connected by a rod having one end secured to said deflector and the other end secured to said separator member.

6. A cage as set forth in claim 5 wherein said separator member has an extension at its lower end projecting into said receptacle whereby liquid excreted matter contacting said separator member flows down said extension and thence into said receptacle.

7. A cage for collecting and separating matter excreted by test animals housed in the cage comprising an upper compartment in which a test animal is confined, a generally funnel-shaped member below said upper compartment having a discharge opening at its lower end, said upper compartment having a foraminous bottom communicating with said funnel-shaped member whereby matter excreted by an animal in any part of the upper compartment may pass through said bottom and be received in said funnel-shaped member, a ball-shaped deflector positioned within the funnel-shaped member over said discharge opening, means for supporting said deflector in spaced relation with said discharge opening and the wall of said funnel-shaped member so that excreted matter received in said funnel-shaped member from the upper compartment may pass between the deflector and the wall of the funnel-shaped member through said discharge opening, a generally spheroidal separator member below said discharge opening and a receptacle below said separator member for collecting liquid excreted matter flowing therein from said separator member.

8. A cage as set forth in claim 7 wherein said receptacle has an open upper end of a width not substantially greater than the widest transverse measurement of said separator member whereby liquid excreted matter contacting the separator member clings to the surface thereof and flows into said receptacle and solid excreted matter falling onto said separator member is deflected outwardly of said receptacle.

9. A cage as set forth in claim 8 wherein said deflector and said separator member are connected by a rod having one end secured to said deflector and the other end secured to said separator member.

10. A cage as set forth in claim 9 wherein said separator member has an extension at its lower end projecting into said receptacle whereby liquid excreted matter contacting said separator member flows down said extension and thence into the receptacle.

11. A cage for collecting and separating matter excreted by test animals housed in the cage comprising a generally cylindrical container having a bottom and an open upper end, a generally funnel-shaped member disposed within the open upper end of said container and having a discharge opening at its lower end extending down into said container, a compartment above said funnel-shaped member adapted to confine a test animal, said compartment having a foraminous bottom communicating with said funnel-shaped member whereby matter excreted by an animal in any part of said compartment may pass through said bottom and be received in said funnel-shaped member, a ball-shaped deflector positioned within said funnel-shaped member over the discharge opening, a plurality of ribs extending out from the inside wall of said funnel-shaped member for supporting said deflector in spaced relation with the wall of said funnel-shaped member and the discharge opening so that excreted matter received in said funnel-shaped member from said compartment may pass between the deflector and the wall of the funnel-shaped member through said discharge opening, a generally egg-shaped separator member below said discharge opening, a rod connecting said deflector and said separator member, and a receptacle located on the bottom of said container below said separator member for collecting liquid excreted matter flowing therein from said separator member.

12. A cage as set forth in claim 11 wherein said receptacle has an open upper end of a width not substantially greater than the widest transverse measurement of said separator member whereby liquid excreted matter contacting the separator member clings to the surface thereof and flows into said receptacle and solid excreted matter falling onto said separator member is deflected outwardly of said receptacle.

13. A cage as set forth in claim 11 wherein said compartment is provided with a removable cover therefor, said cover having a plurality of ventilation openings therein.

14. A cage as set forth in claim 12 wherein said separator member has a rod extending down from the lower end thereof and projecting into said receptacle whereby liquid excreted matter contacting said separator member flows down said rod and drips into said receptacle.

15. Means for encaging a test animal and collecting matter excreted by the animal comprising a cage having a foraminous bottom for passage of excreted matter therethrough, means for supporting said cage in an elevated position, a funnel below said cage for receiving excreted matter passing through the bottom of the cage, said funnel having a discharge opening at the bottom, a deflector positioned within said funnel toward its lower end above said discharge opening and spaced from said discharge opening and the wall of said funnel so that excreted matter passing through the bottom of the cage may pass out of said discharge opening, said deflector being formed to shield said discharge opening from direct fall of excreted matter therethrough and to deflect any excreted matter falling thereon over to the wall of said funnel, and means below said discharge opening for separating liquid and solid excreted matter passing through said discharge opening.

16. Encaging means as set forth in claim 15 wherein said separating means comprises a bulbous member hung on a rod from said deflector.

17. Encaging means as set forth in claim 16 wherein said deflector is a bulbous member.

18. Encaging means as set forth in claim 16 wherein said deflector is a conical member.

19. Encaging means as set forth in claim 15 wherein said funnel has projections spaced around the inside thereof at its lower end, and said deflector bears on said projections.

20. Encaging means as set forth in claim 19 wherein said deflector comprises a ball and said separating means comprises a bulbous member hung on a rod from said ball.

21. Encaging means as set forth in claim 19 wherein said projections have notches at upper inner corners thereof, said deflector is a flaring member having a generally flat bottom received and centered in said notches, and said separating means is a bulbous member hung on a rod from said deflector.

22. Encaging means as set forth in claim 15 wherein said cage comprises a cylindric wall and a removable cover therefor, said funnel being integral with said cylindric wall.

23. Encaging means as set forth in claim 22 having a feeding unit and means for supporting a water bottle on the outside of said cylindric wall.

24. Encaging means as set forth in claim 23 wherein said feeding unit and said bottle-supporting means are removably supported on the outside of said cylindric wall.

25. Encaging means as set forth in claim 23 wherein said feeding unit comprises an open-top receptacle, having a wall spaced from and facing said cylindric wall, said wall of said receptacle having an opening therein, and a foraminous tunnel extending through the latter opening to the opposite side of the receptacle and reaching to said cylindric wall, the latter wall having an opening in communication with the tunnel.

26. Encaging means as set forth in claim 25 wherein the cylindric wall has notched lugs on the outside thereof, and the receptacle has arms having end portions received in the notches in the lugs removably supporting the receptacle on the outside of said cylindric wall.

27. Encaging means as set forth in claim 23 wherein said bottle-supporting means comprises a V-section bottle-supporting cradle inclined upward and outward from said cylindric wall, the latter having an opening for the nipple of the bottle.

28. Encaging means as set forth in claim 27 wherein the cylindric wall has notched lugs on the outside thereof for the cradle, the latter having arms at its inner end having end portions received in the notches in these lugs for removably supporting the cradle on the outside of said cylindric wall.

References Cited by the Examiner
UNITED STATES PATENTS

| | | | |
|---|---|---|---|
| 2,684,051 | 7/1954 | Leblond et al. | 119—17 |
| 2,943,600 | 7/1960 | Rosoff | 119—18 |
| 2,946,308 | 7/1960 | Harris | 119—18 |
| 2,968,281 | 1/1961 | McCauley | 119—18 |
| 2,970,566 | 2/1961 | Detrick | 119—18 |
| 2,997,022 | 8/1961 | Kay | 119—51 |
| 3,107,650 | 10/1963 | Cass | 119—17 |
| 3,114,350 | 12/1963 | King et al. | 119—51 |

SAMUEL KOREN, *Primary Examiner.*

ALDRICH F. MEDBERY, *Examiner.*